(12) United States Patent
Fain et al.

(10) Patent No.: US 7,291,017 B1
(45) Date of Patent: Nov. 6, 2007

(54) POWER INTERFACE DEVICE FOR TRAILER HITCHES

(76) Inventors: Beverly Fain, 2285 Marsh Hawk La., Apt. 9-205, Orange Park, FL (US) 32003; Chris Fain, 2285 Marsh Hawk La., Apt. 9-205, Orange Park, FL (US) 32003

( * ) Notice: Subject to any disclaimer, the term of this patent is extended or adjusted under 35 U.S.C. 154(b) by 391 days.

(21) Appl. No.: 11/103,289

(22) Filed: Apr. 11, 2005

(51) Int. Cl.
*H01R 13/60* (2006.01)

(52) U.S. Cl. .................... 439/35; 439/638; 307/9.1; 307/10.1

(58) Field of Classification Search ............ 439/8, 439/35, 638; 307/9.1, 10.1
See application file for complete search history.

(56) References Cited

U.S. PATENT DOCUMENTS

| | | | | |
|---|---|---|---|---|
| 575,615 | A * | 1/1897 | Osyor | 191/34 |
| 2,404,564 | A * | 7/1946 | Boehlke | 439/8 |
| 3,116,940 | A * | 1/1964 | Jinesa | 280/422 |
| 3,768,837 | A * | 10/1973 | Reese | 280/495 |
| 3,894,242 | A | 7/1975 | Helling | |
| 4,036,543 | A * | 7/1977 | Taketomi | 439/8 |
| 4,138,177 | A * | 2/1979 | VAN Valer | 439/4 |
| 4,248,494 | A | 2/1981 | McDonald et al. | |
| 4,348,035 | A * | 9/1982 | Wasservogel | 280/478.1 |
| 4,746,297 | A * | 5/1988 | Soleau | 439/8 |
| 4,820,963 | A * | 4/1989 | Kobayashi et al. | 318/696 |
| 4,936,796 | A | 6/1990 | Anderson, Jr. | |
| 5,281,147 | A * | 1/1994 | Hughes | 439/35 |
| 5,484,298 | A * | 1/1996 | Flum et al. | 439/188 |
| 5,607,221 | A * | 3/1997 | Justus | 362/485 |
| 5,626,479 | A | 5/1997 | Hughes | |
| 5,729,058 | A * | 3/1998 | Groeller | 307/10.8 |
| 5,766,020 | A * | 6/1998 | Hughes | 439/35 |
| 5,993,262 | A * | 11/1999 | Kowdynski et al. | 439/638 |
| 6,305,945 | B1 | 10/2001 | Vance | |
| 6,390,824 | B1 * | 5/2002 | Vance | 439/35 |
| 6,424,761 | B1 * | 7/2002 | Kordahi et al. | 385/25 |
| 6,447,302 | B1 * | 9/2002 | Davis | 439/34 |
| 6,559,383 | B1 * | 5/2003 | Martin | 174/84 R |
| 6,695,621 | B1 * | 2/2004 | Wang | 439/35 |
| 6,709,275 | B1 * | 3/2004 | Ihde | 439/35 |
| 6,749,438 | B1 * | 6/2004 | Scheller et al. | 439/35 |
| 6,814,581 | B2 * | 11/2004 | Matsuo et al. | 439/35 |
| 6,863,538 | B2 * | 3/2005 | Mattern et al. | 439/35 |
| 2005/0074989 | A1 * | 4/2005 | Pancheri | 439/35 |
| 2005/0112908 | A1 * | 5/2005 | Yueh | 439/8 |

* cited by examiner

*Primary Examiner*—Briggitte R. Hammond
*Assistant Examiner*—Larisa Tsukerman

(57) ABSTRACT

A power adaptor includes an elongated and portable body having a pair of axially opposed end portions. The body includes a pair of diametrically offset L-shaped arms protruding outwardly therefrom. Another of the body end portions and the L-shaped arms define a plurality of respective electrical contacts for receiving a corresponding male receptacle associated with an auxiliary power device. The body further includes a flap directly conjoined to another body end portion and repeatedly pivotal between open and closed positions for sheltering the electrical contact associated with another body end portion during non-operating conditions. The power adaptor further includes a mechanism for regulating power distribution to the electrical contacts such that the power distribution can be automatically disconnected from the body when the tractor trailer power supply source drops below a minimum threshold level set at 12-volts.

15 Claims, 4 Drawing Sheets

POWER INTERFACE DEVICE FOR TRAILER HITCHES

CROSS REFERENCE TO RELATED APPLICATIONS

Not Applicable.

STATEMENT REGARDING FEDERALLY SPONSORED RESEARCH OR DEVELOPMENT

Not Applicable.

REFERENCE TO A MICROFICHE APPENDIX

Not Applicable.

BACKGROUND OF THE INVENTION

1. Technical Field

This invention relates to trailer hitch power adaptors and, more particularly, to a multi-socket power interface device for trailer hitches and the like.

2. Prior Art

In recent years, many electronic and household appliances such as vacuum cleaners, stereos, telephones, and even televisions have become more and more compact and portable. Many of these appliances are now equipped with dual voltage power supply capability. For instance, it is common now to purchase a VCR which not only is connectable to a 110 volt AC style receptacle but may also be equipped with a 12 volt supply connector. Such a connector is most commonly called a cigarette lighter plug.

Cigarette lighters, standard in most motor vehicles, when removed, provides a 12 volt power supply receptacle able to receive a cigarette lighter plug extending from many electronic and household appliances. Problems occur when the desired appliance, such as an electric ice and beverage cooler, is too bulky to keep within the small cab of a pick-up truck in addition to transporting additional passengers. Another problem occurs when one wishes to fill a flattened tire on a trailer using a common 12 volt portable air compressor. The cord is usually too short to reach beyond the end of the vehicle to the trailer wheels.

Other extended power supplies from the vehicle are often needed such as when a second motor vehicle needs a jump start. Most often, when jump starting a second vehicle, the first vehicle must park parallel or "front end to front end" with the second vehicle so a jumper cable can reach both batteries. This can be very dangerous because the first vehicle is required to drive against the flow of traffic or park within the flow of traffic to get positioned with the second vehicle. It would then be much simpler to jump start a second vehicle from the rear of a first vehicle.

In addition, individuals such as campers, hikers, and picnickers sometimes find themselves in locations which have no electrical power source. These individuals are often in need of an electrical power source to power electrical accessories such as portable grilles, lights or coolers. However, many of these accessories have male cigarette lighter plugs which are engageable to the female cigarette lighter plug of a motor vehicle. Thus, if an individual has an accessory with a male cigarette lighter plug and also has a motor vehicle, it is possible to supply power to the accessory by use of the female cigarette lighter plug located in the vehicle.

However, the electrical cord, which electrically connects the accessory to the male cigarette lighter plug, is usually fairly short. Because of the short length of the electrical cord, the accessory must be placed in close proximity with the female cigarette lighter plug. Typically, female cigarette lighter plugs, located in motor vehicles, are positioned on or around the dashboard area. This location is remote from the external environment of the vehicle. Therefore, in order to engage the male cigarette lighter plug, having a relatively short electrical cord, with the female cigarette lighter plug, the accessory must be either positioned in the vehicle and close to the female cigarette lighter plug or the accessory must be provided with some form of cable extension.

Accordingly, a need remains for a power adaptor that overcomes the above noted shortcomings. The present invention satisfies such a need by providing a power interface device for trailer hitches that allows a user to power portable electrical devices easily and readily from the rear of the vehicle. Such a power adaptor conveniently converts the 12-volt power of a vehicle's electrical system to 110 volt power at the trailer hitch instead of the conventional method of using a cigarette lighter adaptor. This allows a user to power such devices at a greater distance from the front of the vehicle than might otherwise be possible.

BRIEF SUMMARY OF THE INVENTION

In view of the foregoing background, it is therefore an object of the present invention to provide a 12-volt power supply adaptor for use with tractor trailers and the like. These and other objects, features, and advantages of the invention are provided by a power adaptor including an elongated and portable body sized and shaped for being removably positioned between a tractor trailer and an associated trailer hitch. Such a body has a centrally registered longitudinal axis and a pair of axially opposed end portions wherein one of the end portions is rotatably articulatable about the axis for assisting an operator to adjustably position the body in confined areas located between the tractor and the trailer hitch respectively.

The body includes a pair of diametrically offset L-shaped arms protruding outwardly therefrom in such a manner that the L-shaped arms can be rotated along independent arcuate paths extending along a 360 degree circumference extending parallel to the axis. Another of the body end portions and the L-shaped arms define a plurality of respective electrical contacts for receiving a corresponding female receptacle associated with an auxiliary power device so that the auxiliary power device can be directly mated to the body exterior of the tractor trailer while drawing power from a tractor trailer power supply source located within an engine compartment thereof. The body further includes a flap directly conjoined to another body end portion and repeatedly pivotal between open and closed positions for sheltering the electrical contact associated with another body end portion during non-operating conditions.

The rotatable end portion of the body includes overlapping first and second spherical portions directly lockable to each other in such a manner that the first and second spherical portions can independently rotate in alternate directions. The first spherical portion has a first lip monolithically formed therewith and directly conjoined to a selected portion of the body such that the first spherical portion can be detached from the body and allow an operator to access an interior thereof during repair procedures. The second spherical portion is detachable from the first spherical portion such that an operator can quickly. A plurality of conductive leads having opposed end portions are directly mated to the electrical contacts and housed within the body.

The power adaptor further includes a mechanism for regulating power distribution to the electrical contacts such that the power distribution can be automatically disconnected from the body when the tractor trailer power supply source drops below a minimum threshold level set at 12-volts.

The power regulating mechanism includes a processor and a voltage regulating gate housed with the body and electrically mated to the processor. The gate includes a memory bearing software instructions for performing the steps of: determining a voltage input level and calculating a cumulative voltage output level.

A plurality of switches are directly connected in series to the gate. Each of the switches define a unique path leading to one of the electrical contacts respectively such that the electrical contacts can be independently activated and deactivated during operating conditions. At least one LED is electrically coupled to the gate and a transducer is electrically mateable to the gate. The transducer generates an audible signal when the switches are toggled between active and inactive modes respectively.

The gate selectively toggles the switches to a closed position when the voltage input level is greater than the cumulative voltage output level, the gate selectively toggles the switches to an open position when the voltage input level is less than the cumulative voltage output level such that the power adaptor can effectively and automatically prevent the tractor power supply source from becoming depleted during non-operating conditions. The LED is illuminable to first and second colors when the switches are opened and closed respectively.

Selected ones of the electrical contacts preferably include a 12-volt socket for electrically receiving and powering hand-held portable tools. Each L-shaped arm includes a ball-shaped first end portion. The body may be provided with a plurality of sockets formed generally medially along a longitudinal length thereof for receiving the ball-shaped end portions therein and allowing the L-shaped arms to freely rotate without interfering with the opposed end portions of the body. The body further preferably includes a hooked fastener directly connected to an outer surface thereof such that the operator can hang the body on an elevated support surface while employing a hand-operable power tool electrically mated to the power adaptor.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

It is noted the purpose of the foregoing abstract is to enable the U.S. Patent and Trademark Office and the public generally, especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

BRIEF DESCRIPTION OF THE SEVERAL VIEWS OF THE DRAWING

The novel features believed to be characteristic of this invention are set forth with particularity in the appended claims. The invention itself, however, both as to its organization and method of operation, together with further objects and advantages thereof, may best be understood by reference to the following description taken in connection with the accompanying drawings in which:

DETAILED DESCRIPTION OF THE INVENTION

Figure 1:
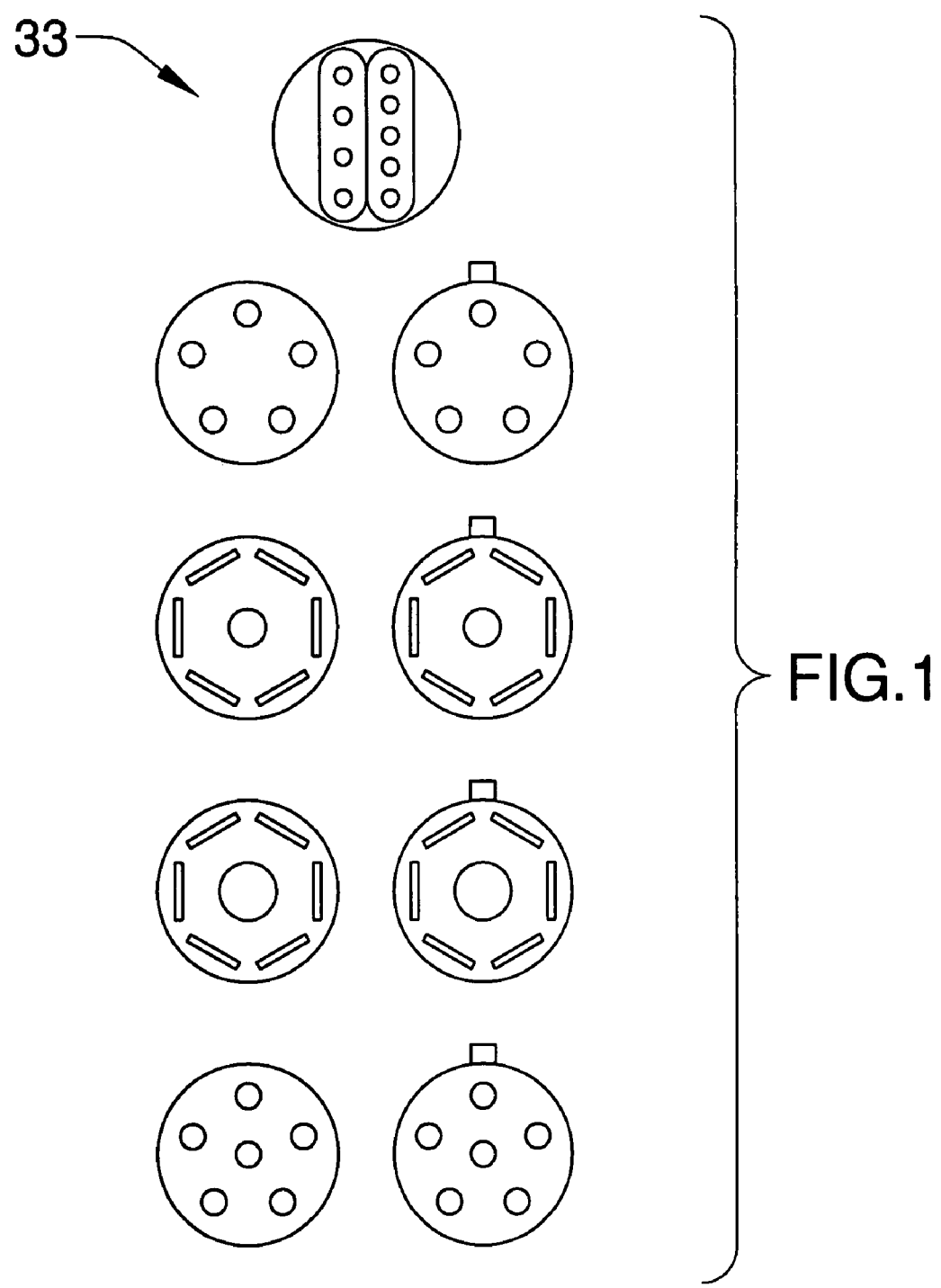
FIG. 1 is a side elevational view showing various shaped plugs that may be employed, in accordance with the present invention.

The present invention will now be described more fully hereinafter with reference to the accompanying drawings, in which a preferred embodiment of the invention is shown. This invention may, however, be embodied in many different forms and should not be construed as limited to the embodiment set forth herein. Rather, this embodiment is provided so that this application will be thorough and complete, and will fully convey the true scope of the invention to those skilled in the art. Like numbers refer to like elements throughout the figures.

The device of this invention is referred to generally in FIGS. 1-4 by the reference numeral 10 and is intended to provide a 12-volt power supply adaptor for use with tractor trailers and the like. It should be understood that the device 10 may be used to adapt power from many different types of vehicles and should not be limited to use only with tractor-trailers.

Figure 2:
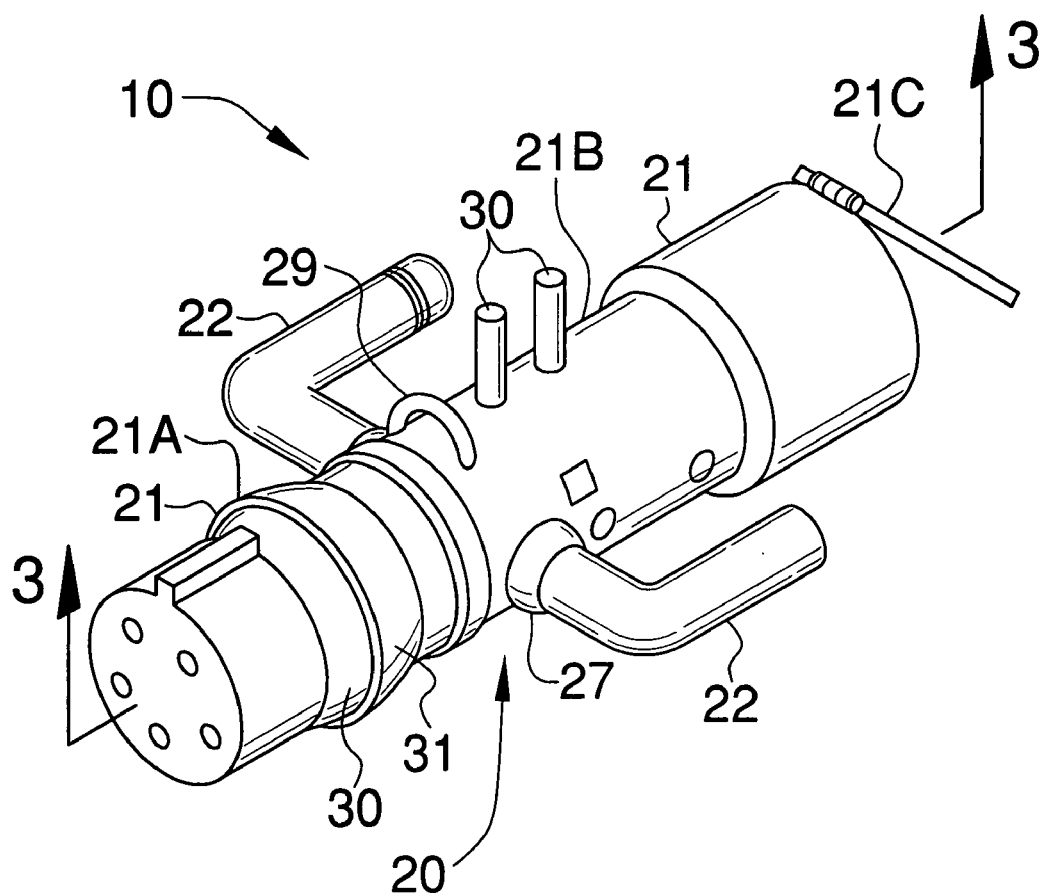
FIG. 2 is a perspective view of a power interface device for trailer hitches, in accordance with the present invention.
Figure 3:
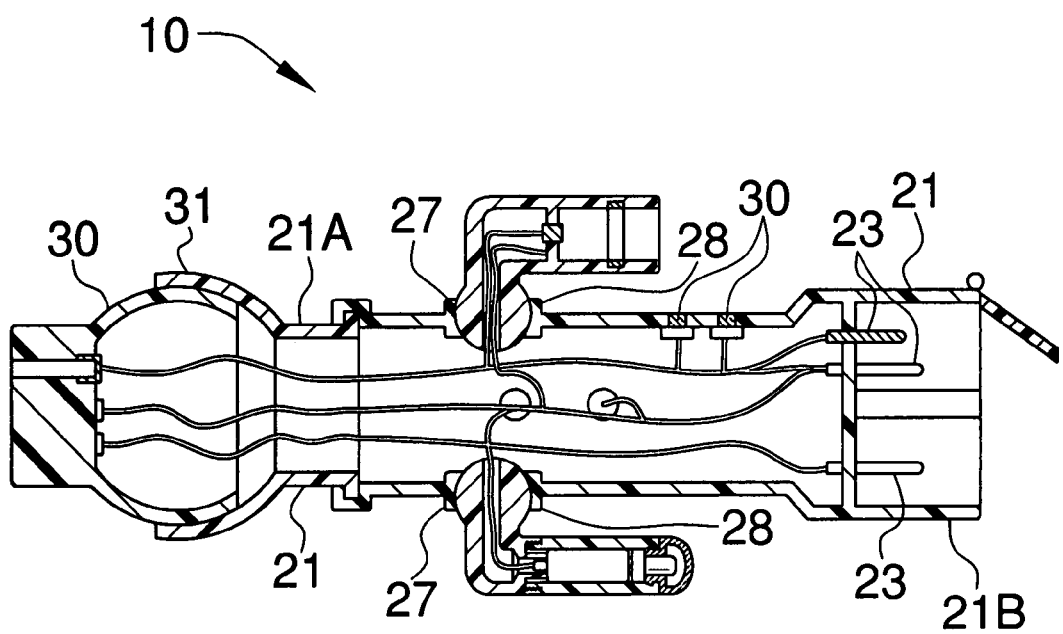
FIG. 3 is a cross-sectional view of the device shown in FIG. 2, taken along line 2-2.

Initially referring to FIGS. 2 and 3, the device 10 includes an elongated and portable body 20 sized and shaped for being removably positioned between a tractor trailer and an associated trailer hitch. The body 20 is preferably formed from durable rubber material for its strength, flexibility, and ability to resist corrosion in an outdoor environment, but may also be formed from plastic or other non-conductive material as is obvious to one having ordinary skill in the art. Such a body 20 has a centrally registered longitudinal axis (not shown) and a pair of axially opposed end portions 21 wherein one of the end portions 21A is rotatably articulatable about the axis for assisting an operator to adjustably position the body 20 in confined areas located between the tractor and the trailer hitch respectively.

The body 20 includes a pair of diametrically offset L-shaped arms 22 protruding outwardly therefrom in such a manner that the L-shaped arms 22 can be rotated along independent arcuate paths extending along a 360 degree circumference extending parallel to the axis. Another 21B of the body end portions and the L-shaped arms 22 define a plurality of respective electrical contacts 23 for receiving a corresponding female male receptacle (not shown) associated with an auxiliary power device 25 so that the auxiliary power device 25 can be directly mated to the body 20 exterior of the tractor trailer while drawing power from a tractor trailer power supply source located within an engine compartment thereof, as shown in FIG. 4.

The body 20 further includes a flap 21C directly conjoined, with no intervening elements, to another body end portion 21B and repeatedly pivotal between open and closed positions for sheltering the electrical contact associated with the body end portion 21A during non-operating conditions.

Still referring to FIGS. 2 and 3, the rotatable end portion 21 of the body 20 includes overlapping first 30 and second spherical 31 portions directly lockable, with no intervening elements, to each other in such a manner that the first 30 and second 31 spherical portions can independently rotate in alternate directions. The first spherical portion 30 has a first lip monolithically formed therewith and directly conjoined, with no intervening elements, to a selected portion of the body 20 such that the first spherical portion 30 can be detached from the body 20 and allow an operator to access an interior thereof during repair procedures. The second spherical portion 31 is detachable from the first spherical portion 30 such that an operator can quickly and readily employ various shaped plugs 33 as needed, as shown in FIG. 1, and as well known in the industry. A plurality of conductive leads 32 having opposed end portions 34 are directly mated, with no intervening elements, to the electrical contacts 23 and housed within the body 20.

Figure 4:
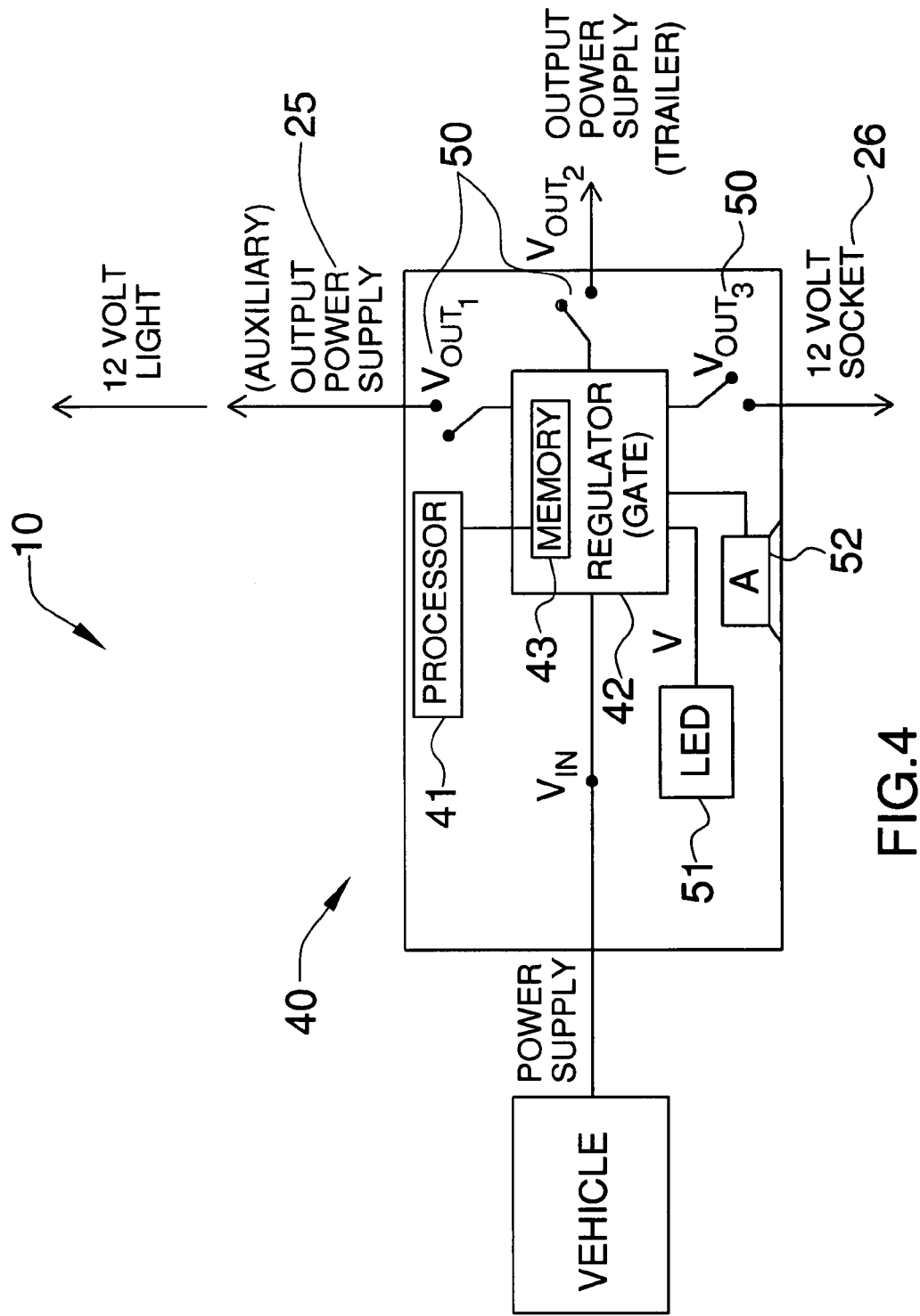
FIG. 4 is a schematic block diagram of the power adaptor, illustrating the voltage in and voltage out.

Referring to FIGS. 3 and 4, the power adaptor 10 further includes a mechanism 40 for regulating power distribution to the electrical contacts 23 such that the power distribution can be automatically disconnected from the body 20 when the tractor trailer power supply source drops below a minimum threshold level set at 12-volts. The power regulating mechanism 40 includes a processor 41 and a voltage regulating gate 42 housed with the body 20 and electrically mated to the processor 41. The gate 42 includes a memory bearing software 43 instructions for performing the steps of: determining a voltage input level and calculating a cumulative voltage output level, thus ensuring that such steps are repeated time after time, without fail.

Referring to FIGS. 3 and 4, a plurality of switches 50 are directly connected in series to the gate 42. Each of the switches 50 define a unique path leading to one of the electrical contacts 23 respectively such that the electrical contacts 23 can be independently activated and deactivated during operating conditions. At least one LED 51 is electrically coupled to the gate 42 and a piezoelectric transducer 52 is electrically mateable to the gate 42. The transducer 52 generates an audible signal when the switches 50 are toggled between active and inactive modes respectively, thus alerting a user when power is available. Of course, such a transducer 52 could also include a voice synthesizer for generating voice sounds that communicate the status of the power adaptor 10 to a user in a language they can understand.

The gate 42 selectively toggles the switches 50 to a closed position when the voltage input level is greater than the cumulative voltage output level. The gate 42 is critical to the operation of the power adaptor 10 because it selectively toggles the switches 50 to an open position when the voltage input level is less than the cumulative voltage output level such that the power adaptor 10 can effectively and automatically prevent the tractor power supply source from becoming depleted during non-operating conditions. This advantageously saves battery power that may be needed to start the vehicle, particularly if stranded or working in an isolated area where help might not be readily available. The LED 51 is illuminable to first and second colors when the switches 50 are opened and closed respectively so that a user can easily and readily ascertain the status of the power adaptor 10.

Referring back to FIG. 3, selected ones of the electrical contacts 23 include a 12-volt socket 26 for electrically receiving and powering hand-held portable tools. Each L-shaped arm 22 includes a ball-shaped first end portion 27. The body 20 is provided with a plurality of sockets 28 formed generally medially along a longitudinal length thereof for receiving the ball-shaped end portions 27 therein and allowing the L-shaped arms 22 to freely rotate without interfering with the opposed end portions 21 of the body 20. Of course, electrical contacts 30 can be modified to include conventional 3-prong and 2-prong plugs that can be directly mated with a flashlight, hair dryer, hair-clippers and other portable tools that require 12-volt power, for example.

The body 20 further includes a hooked fastener 29 directly connected to an outer surface thereof such that the operator can hang the body 20 on an elevated support surface while employing a hand-operable power tool electrically mated to the power adaptor 10. Such a fastener 29 enables a user to hang the power adaptor in a convenient location where, for example, a portable light being powered might provide the best illumination for the project or circumstances, especially at night or in inclement weather conditions.

While the invention has been described with respect to a certain specific embodiment, it will be appreciated that many modifications and changes may be made by those skilled in the art without departing from the spirit of the invention. It is intended, therefore, by the appended claims to cover all such modifications and changes as fall within the true spirit and scope of the invention.

In particular, with respect to the above description, it is to be realized that the optimum dimensional relationships for the parts of the present invention may include variations in size, materials, shape, form, function and manner of operation. The assembly and use of the present invention are deemed readily apparent and obvious to one skilled in the art.

What is claimed as new and what is desired to secure by Letters Patent of the United States is:

1. A 12-volt power supply adaptor for use with tractor trailers comprising:

an elongated and portable body sized and shaped for being removably positioned between a tractor trailer and an associated trailer hitch, said body having a centrally registered longitudinal axis and a pair of axially opposed end portions wherein one said end portions is rotatably articulatable about the axis for assisting an operator to adjustably position said body in confined areas located between the tractor and the trailer hitch respectively, said body including a pair of diametrically offset L-shaped arms protruding outwardly therefrom in such a manner that said L-shaped arms can be rotated along independent arcuate paths extending along a 360 degree circumference extending parallel to the axis, another said body end portions and said L-shaped arms defining a plurality of respective electrical contacts for receiving a corresponding male receptacle associated with an auxiliary power device so that the auxiliary power device can be directly mated to said body exterior of the tractor trailer while drawing power from a tractor trailer power supply source located within an engine compartment thereof, said body further including a flap directly conjoined to said another body end portion and repeatedly pivotal between open and closed positions for sheltering said electrical contact associated with said another body end portion during non-operating conditions;

a plurality of conductive leads having opposed end portions directly mated to said electrical contacts and housed within said body; and means for regulating power distribution to said electrical contacts such that the power distribution can be automatically disconnected from said body when the tractor trailer power supply source drops below a minimum threshold level, said minimum threshold level being set at 12-volts.

2. The power adaptor of claim 1, wherein said power regulating means comprises:
   a processor;
   a voltage regulating gate housed with said body and electrically mated to said processor, said gate including a memory bearing software instructions for performing the steps of:
      determining an voltage input level, and
      calculating a cumulative voltage output level;
   a plurality of switches directly connected in series to said gate, each said switches defining a unique path leading to one said electrical contacts respectively such that said electrical contacts can be independently activated and deactivated during operating conditions;
   at least one LED electrically coupled to said gate; and
   a transducer electrically mateable to said gate, said transducer generating an audible signal when said switches are toggled between active and inactive modes respectively;
   wherein said gate selectively toggles said switches to a closed position when the voltage input level is greater than the cumulative voltage output level, said gate selectively toggling said switches to an open position when the voltage input level is less than the cumulative voltage output level such that said power adaptor can effectively and automatically prevent the tractor power supply source from becoming depleted during non-operating conditions, said LED being illuminable to first and second colors when said switches are opened and closed respectively.

3. The power adaptor of claim 1, wherein selected ones of said electrical contacts comprise: a 12-volt socket for electrically receiving and powering hand-held portable tools.

4. The power adaptor of claim 1, wherein each said L-shaped arm comprises: a ball-shaped first end portion, said body being provided with a plurality of sockets formed generally medially along a longitudinal length thereof for receiving said ball-shaped end portions therein and allowing said L-shaped arms to freely rotate without interfering with said opposed end portions of said body.

5. The power adaptor of claim 1, wherein said body further includes a hooked fastener directly connected to an outer surface thereof such that the operator can hang said body on an elevated support surface while employing a hand-operable power tool electrically mated to said power adaptor.

6. A 12-volt power supply adaptor for use with tractor trailers comprising:
   an elongated and portable body sized and shaped for being removably positioned between a tractor trailer and an associated trailer hitch, said body having a centrally registered longitudinal axis and a pair of axially opposed end portions wherein one said end portions is rotatably articulatable about the axis for assisting an operator to adjustably position said body in confined areas located between the tractor and the trailer hitch respectively, said body including a pair of diametrically offset L-shaped arms protruding outwardly therefrom in such a manner that said L-shaped arms can be rotated along independent arcuate paths extending along a 360 degree circumference extending parallel to the axis, another said body end portions and said L-shaped arms defining a plurality of respective electrical contacts for receiving a corresponding male receptacle associated with an auxiliary power device so that the auxiliary power device can be directly mated to said body exterior of the tractor trailer while drawing power from a tractor trailer power supply source located within an engine compartment thereof, said body further including a flap directly conjoined to said another body end portion and repeatedly pivotal between open and closed positions for sheltering said electrical contact associated with said another body end portion during non-operating conditions;
   wherein said rotatable end portion of said body comprises overlapping first and second spherical portions directly lockable to each other in such a manner that said first and second spherical portions can independently rotate in alternate directions, said first spherical portion having a first lip monolithically formed therewith and directly conjoined to a selected portion of said body such that said first spherical portion can be detached from said body and allow an operator to access an interior thereof during repair procedures;
   a plurality of conductive leads having opposed end portions directly mated to said electrical contacts and housed within said body; and
   means for regulating power distribution to said electrical contacts such that the power distribution can be automatically disconnected from said body when the tractor trailer power supply source drops below a minimum threshold level, said minimum threshold level being set at 12-volts.

7. The power adaptor of claim 6, wherein said power regulating means comprises:
   a processor;
   a voltage regulating gate housed with said body and electrically mated to said processor, said gate including a memory bearing software instructions for performing the steps of:
      determining an voltage input level, and
      calculating a cumulative voltage output level;
   a plurality of switches directly connected in series to said gate, each said switches defining a unique path leading to one said electrical contacts respectively such that said electrical contacts can be independently activated and deactivated during operating conditions;
   at least one LED electrically coupled to said gate; and
   a transducer electrically mateable to said gate, said transducer generating an audible signal when said switches are toggled between active and inactive modes respectively;
   wherein said gate selectively toggles said switches to a closed position when the voltage input level is greater than the cumulative voltage output level, said gate selectively toggling said switches to an open position when the voltage input level is less than the cumulative voltage output level such that said power adaptor can effectively and automatically prevent the tractor power supply source from becoming depleted during non-operating conditions, said LED being illuminable to first and second colors when said switches are opened and closed respectively.

8. The power adaptor of claim 6, wherein selected ones of said electrical contacts comprise: a 12-volt socket for electrically receiving and powering hand-held portable tools.

9. The power adaptor of claim 6, wherein each said L-shaped arm comprises: a ball-shaped first end portion, said body being provided with a plurality of sockets formed generally medially along a longitudinal length thereof for receiving said ball-shaped end portions therein and allowing said L-shaped arms to freely rotate without interfering with said opposed end portions of said body.

10. The power adaptor of claim 6, wherein said body further includes a hooked fastener directly connected to an outer surface thereof such that the operator can hang said body on an elevated support surface while employing a hand-operable power tool electrically mated to said power adaptor.

11. A 12-volt power supply adaptor for use with tractor trailers comprising:

an elongated and portable body sized and shaped for being removably positioned between a tractor trailer and an associated trailer hitch, said body having a centrally registered longitudinal axis and a pair of axially opposed end portions wherein one said end portions is rotatably articulatable about the axis for assisting an operator to adjustably position said body in confined areas located between the tractor and the trailer hitch respectively, said body including a pair of diametrically offset L-shaped arms protruding outwardly therefrom in such a manner that said L-shaped arms can be rotated along independent arcuate paths extending along a 360 degree circumference extending parallel to the axis, another said body end portions and said L-shaped arms defining a plurality of respective electrical contacts for receiving a corresponding male receptacle associated with an auxiliary power device so that the auxiliary power device can be directly mated to said body exterior of the tractor trailer while drawing power from a tractor trailer power supply source located within an engine compartment thereof, said body further including a flap directly conjoined to said another body end portion and repeatedly pivotal between open and closed positions for sheltering said electrical contact associated with said another body end portion during non-operating conditions;

wherein said rotatable end portion of said body comprises overlapping first and second spherical portions directly lockable to each other in such a manner that said first and second spherical portions can independently rotate in alternate directions, said first spherical portion having a first lip monolithically formed therewith and directly conjoined to a selected portion of said body such that said first spherical portion can be detached from said body and allow an operator to access an interior thereof during repair procedures, said second spherical portion being detachable from said first spherical portion such that an operator can quickly and readily employ various shaped plugs as needed;

a plurality of conductive leads having opposed end portions directly mated to said electrical contacts and housed within said body; and means for regulating power distribution to said electrical contacts such that the power distribution can be automatically disconnected from said body when the tractor trailer power supply source drops below a minimum threshold level, said minimum threshold level being set at 12-volts.

12. The power adaptor of claim 11, wherein said power regulating means comprises:

a processor;

a voltage regulating gate housed with said body and electrically mated to said processor, said gate including a memory bearing software instructions for performing the steps of:

determining an voltage input level, and calculating a cumulative voltage output level;

a plurality of switches directly connected in series to said gate, each said switches defining a unique path leading to one said electrical contacts respectively such that said electrical contacts can be independently activated and deactivated during operating conditions;

at least one LED electrically coupled to said gate; and a transducer electrically mateable to said gate, said transducer generating an audible signal when said switches are toggled between active and inactive modes respectively;

wherein said gate selectively toggles said switches to a closed position when the voltage input level is greater than the cumulative voltage output level, said gate selectively toggling said switches to an open position when the voltage input level is less than the cumulative voltage output level such that said power adaptor can effectively and automatically prevent the tractor power supply source from becoming depleted during non-operating conditions, said LED being illuminable to first and second colors when said switches are opened and closed respectively.

13. The power adaptor of claim 11, wherein selected ones of said electrical contacts comprise: a 12-volt socket for electrically receiving and powering hand-held portable tools.

14. The power adaptor of claim 11, wherein each said L-shaped arm comprises: a ball-shaped first end portion, said body being provided with a plurality of sockets formed generally medially along a longitudinal length thereof for receiving said ball-shaped end portions therein and allowing said L-shaped arms to freely rotate without interfering with said opposed end portions of said body.

15. The power adaptor of claim 11, wherein said body further includes a hooked fastener directly connected to an outer surface thereof such that the operator can hang said body on an elevated support surface while employing a hand-operable power tool electrically mated to said power adaptor.

* * * * *